United States Patent [19]

Obenshain

[11] 4,077,291

[45] Mar. 7, 1978

[54] WEB SLITTING APPARATUS

[75] Inventor: David Noel Obenshain, Swanton, Md.

[73] Assignee: Westvaco Corporation, New York, N.Y.

[21] Appl. No.: 777,780

[22] Filed: Mar. 15, 1977

[51] Int. Cl.² .............................................. B23D 19/06

[52] U.S. Cl. ...................................... 83/499; 83/508.3

[58] Field of Search .............. 83/499, 498, 504, 508.1, 83/508.2, 508.3, 425.4, 425.2, 560; 93/58.2

[56] References Cited

U.S. PATENT DOCUMENTS

| | | | |
|---|---|---|---|
| 507,074 | 10/1893 | Macy | 83/499 |
| 3,257,882 | 6/1966 | Lulie et al. | 83/499 X |
| 3,587,374 | 6/1971 | Stewart | 83/499 X |
| 3,760,697 | 9/1973 | Besemann | 83/499 X |
| 3,929,047 | 12/1975 | Brandl | 83/499 |
| 4,010,677 | 3/1977 | Hirakawa | 83/499 X |

*Primary Examiner*—J. M. Meister

[57] ABSTRACT

A web slitting apparatus for operating on a traveling web of paper or the like to trim the web and/or slit the web into multiple webs having different widths comprises two or more slitter units consisting of coacting pairs of slitter blade elements and slitter band elements located above and below the web. Each of the slitter units is mounted to traverse the web from side-to-side either individually or simultaneously in response to a single driving means which adjusts the position of the slitter units across the web.

1 Claim, 6 Drawing Figures

WEB SLITTING APPARATUS

BACKGROUND OF THE INVENTION

The present invention relates generally to a slitter system wherein a web of paper or the like fed from a supply roll is trimmed and/or slit into two or more narrower webs. The invention was developed in connection with other improvements to the sheet cutting and stacking machines disclosed generally in applicants' prior U.S. Pat. Nos. 3,203,326 and 3,272,044, however, the invention herein is not limited to such an application. For instance, the slitting apparatus of the present invention could be used independently with a rewinding apparatus if desired.

The slitter units are mounted on a machine frame or the like for transverse movement across the web substantially as disclosed in the prior art. However, with the apparatus of the present invention, the slitter units can be positioned across the web far more readily and with greater accuracy than has been possible with prior art systems. Further, the apparatus of the present invention accomplishes its goals with less complicated equipment and with more automatic control than the systems of the prior art, to wit, only a single drive motor is required for the present invention.

The following prior U.S. patents are exemplary of the known slitter unit positioning systems:

U.S. Pat. No. 1,118,831
U.S. Pat. No. 3,176,566 (83-348)
U.S. Pat. No. 3,332,326 (93-58.2)

In U.S. Pat. No. 1,118,831, there is disclosed a slitting apparatus with a means for positioning the slitter knives with respect to one another. However, the apparatus disclosed therein requires a cumbersome manual adjustment which is time consuming and difficult to accomplish with a high degree of accuracy. U.S. Pat. No. 3,176,566 discloses a slitter system wherein the slitter units are positioned across the web by a remote means, but the individual slitter blades and slitter bands of each slitter unit are moved by separate, attached motors. Obviously the system disclosed therein would be subject to inconsistencies in the various drive motors, feedback units and actuation units, not to mention the increased costs and maintenance required for individual component motors. U.S. Pat. No. 3,332,326 discloses a system similar to that of the aforementioned patent except that a means is disclosed therein for simultaneously driving both of the elements of a slitter unit pair for gross displacement of the slitter units with respect to one another. However, the patented system still requires an individual motor for each slitter unit element and thus lacks the flexibility and simplicity of the apparatus disclosed for the present invention.

SUMMARY OF INVENTION

According to the present invention, one or more web slitting units can be moved laterally across a traveling web of paper or the like by a single power source remote from the slitter units. The apparatus of the present invention is capable of achieving a high degree of precision of adjustment. The power source preferably comprises an electric motor or the like that is located on the machine frame which carries the slitter units. The motor is used to displace the individual slitter unit elements (blades and bands) through separate switches connected to combination clutch/brake assemblies which permit separate or combinations of driving motions at the same time. Thus, a single or common drive means displaces the slitter units individually or collectively, as desired to position the slitter units across the web for trimming the edges of the web or slitting the web into two or more narrow strips. Each slitter unit includes an independent means for opening and closing the slitter nip and a separate means if required for rotating the slitter elements. In addition, each slitter unit has attached thereto a scale device which provides visual means whereby the operator may determine the lateral position of the individual slitter units across the web at any given time.

The slitter unit elements are mounted independently of one another as a pair (blade element and band element) above and below the web on support plates suspended on guide shafts which are fixed between suitable machine frame elements at each side of the web. The support plates are also provided with means attached thereto through which suitable driving devices are passed for causing displacement of the support plates and slitter elements along the guide shafts. The driving or slitter element position adjusting devices of a slitter unit pair are connected together so that movement of one slitter unit element along its guide shaft in one direction produces a concurrent movement of the paired slitter unit element in the same direction. Accordingly, once the elements of a slitter unit are precisely aligned, they remain so aligned barring a mechanical break in the connection therebetween. One of the slitter unit position adjusting devices of a given pair is connected to a suitable clutch/brake device, and a separate clutch/brake unit is provided for each slitter unit. The clutch/brake devices are in turn connected to the single drive source or electric motor by a common connecting means and separate actuation switches are provided for each individual slitter unit. The individual switches provide control for a locked or drive condition for a clutch/brake assembly, directional rotation and speed of rotation. In this manner the clutch/brake assemblies for each slitter unit can be actuated individually or collectively as desired for accurate and positive slitter unit adjustment.

DETAILED DESCRIPTION

Figure 1A:
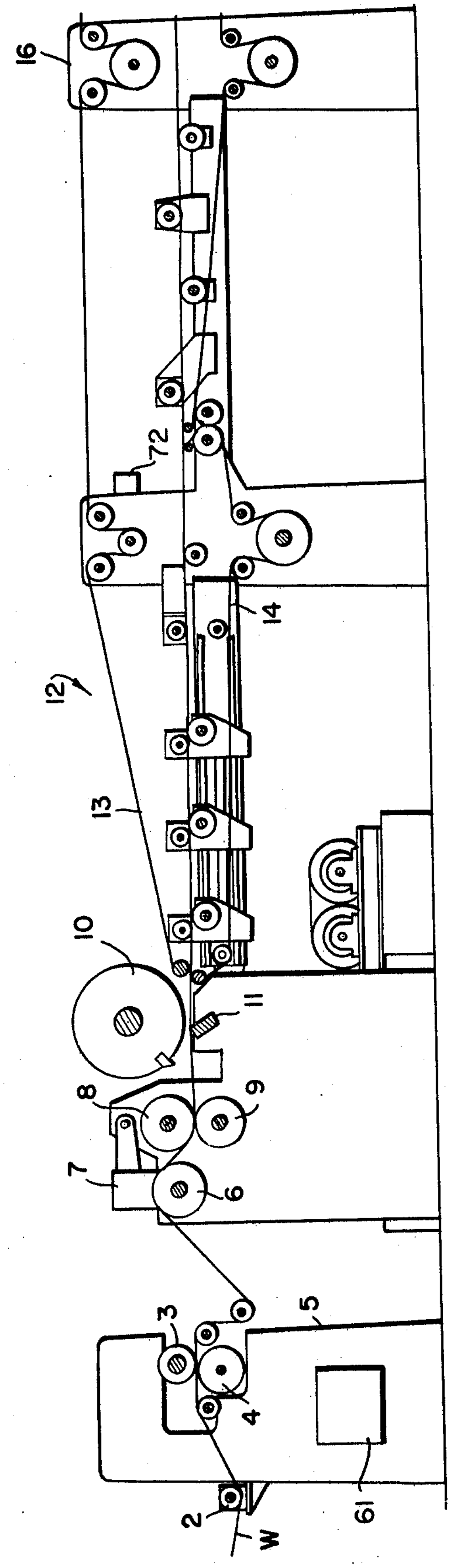
FIG. 1A shows schematically a first part of a machine incorporating the slitting apparatus of the present invention.
Figure 1B:
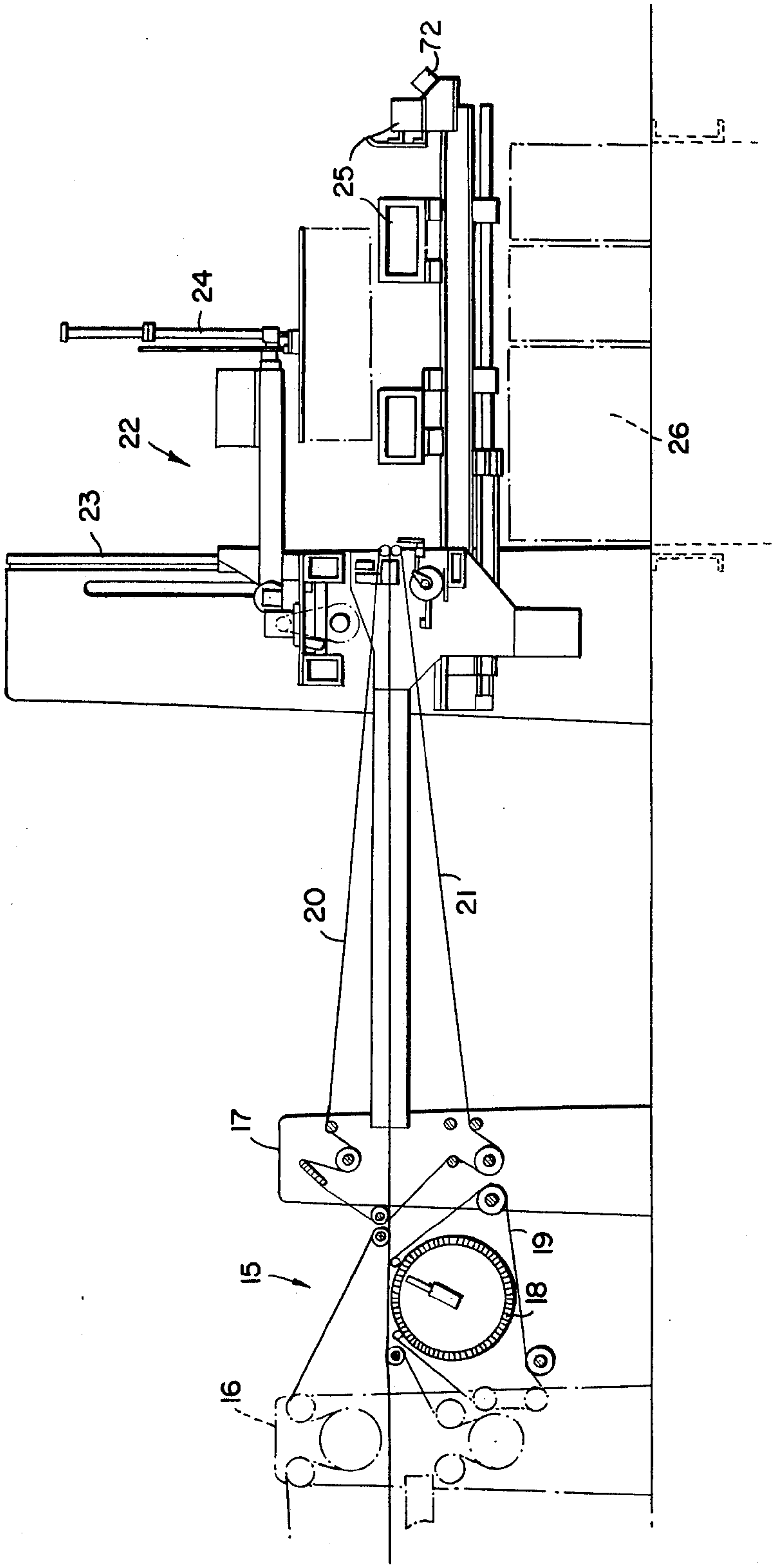
FIG. 1B shows schematically the second part of the machine of FIG. 1A.

The slitter system is illustrated in FIGS. 1A and 1B as a matter of convenience only and the remaining apparatus shown in FIGS. 1A and 1B is more fully described in copending U.S. patent application Ser. No. 755,971, filed Dec. 29, 1976.

Figure 2:
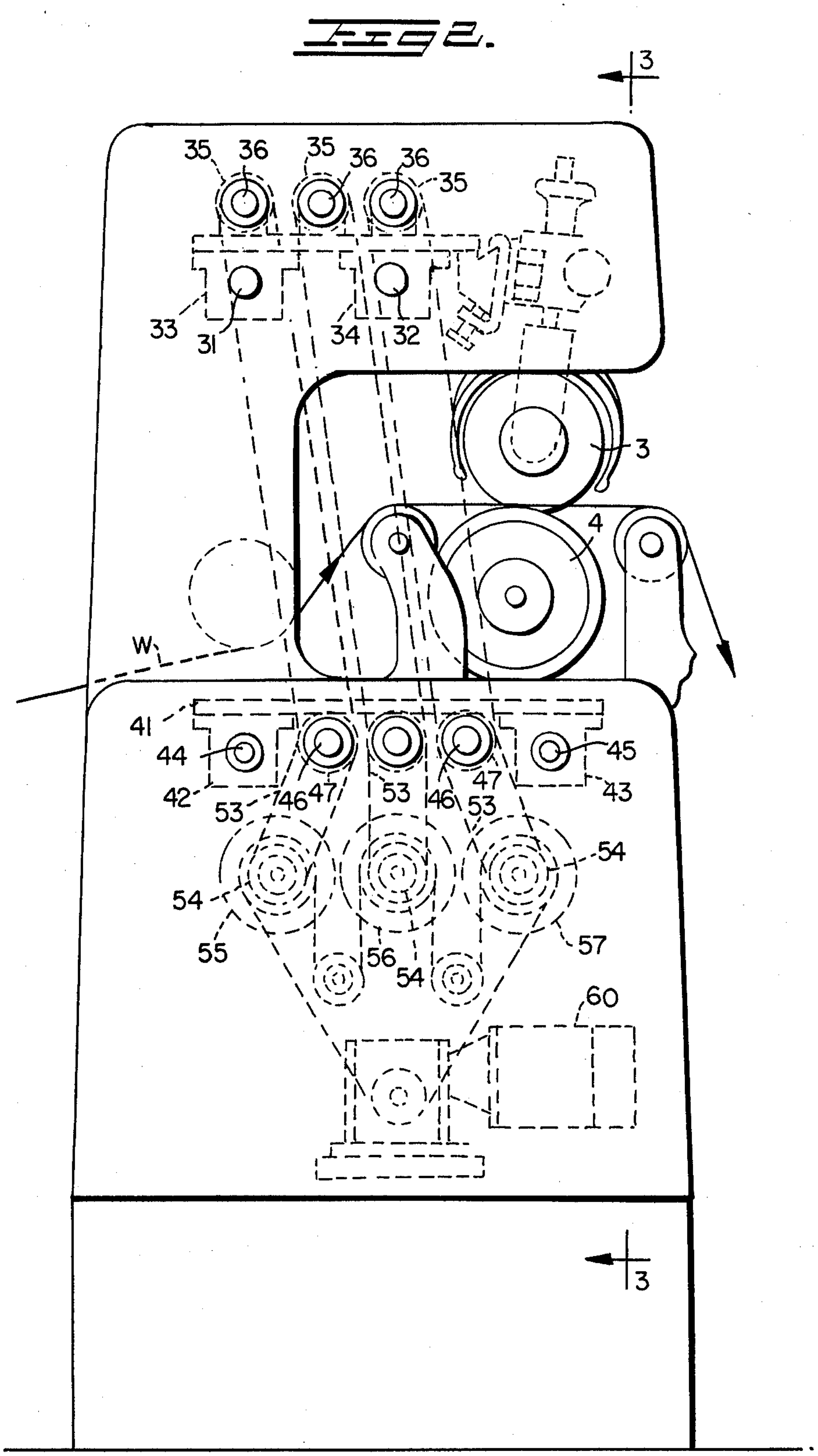
FIG. 2 is a side view partially in section showing schematically the arrangement and connections of the machine elements for the slitting apparatus of the present invention.

In general, the slitter system of the present invention comprises a plurality of two or more slitter units consisting of slitter blade elements 3 positioned above the web W and slitter band elements 4 positioned below the web W of paper or the like. A single slitter unit is shown in FIG. 1A wherein it is seen to be operating on the web W as it passes over a pair of spaced guide rolls. The slitter system can be used to slit or trim the edges of the web to the desired size or employed to slit the web into two or more widths depending upon the number of slitter units used. The slitter unit elements pairs (blades 3, bands 4) are mounted on guiding and supporting shafts which are arranged transversely of the web W between end frame members 5,5. An operator's control panel 61 is provided on the machine frame 5 for actuating the slitter unit positioning means and two remote control stations 72 shown in FIGS. 1A and 1B are provided for controlling the movements of the slitter units from different positions along the machine. FIG. 2 shows in more detail the arrangement for mounting the slitter unit elements and the driving connections for moving the slitter units into different locations transversely of the web.

Figure 3:
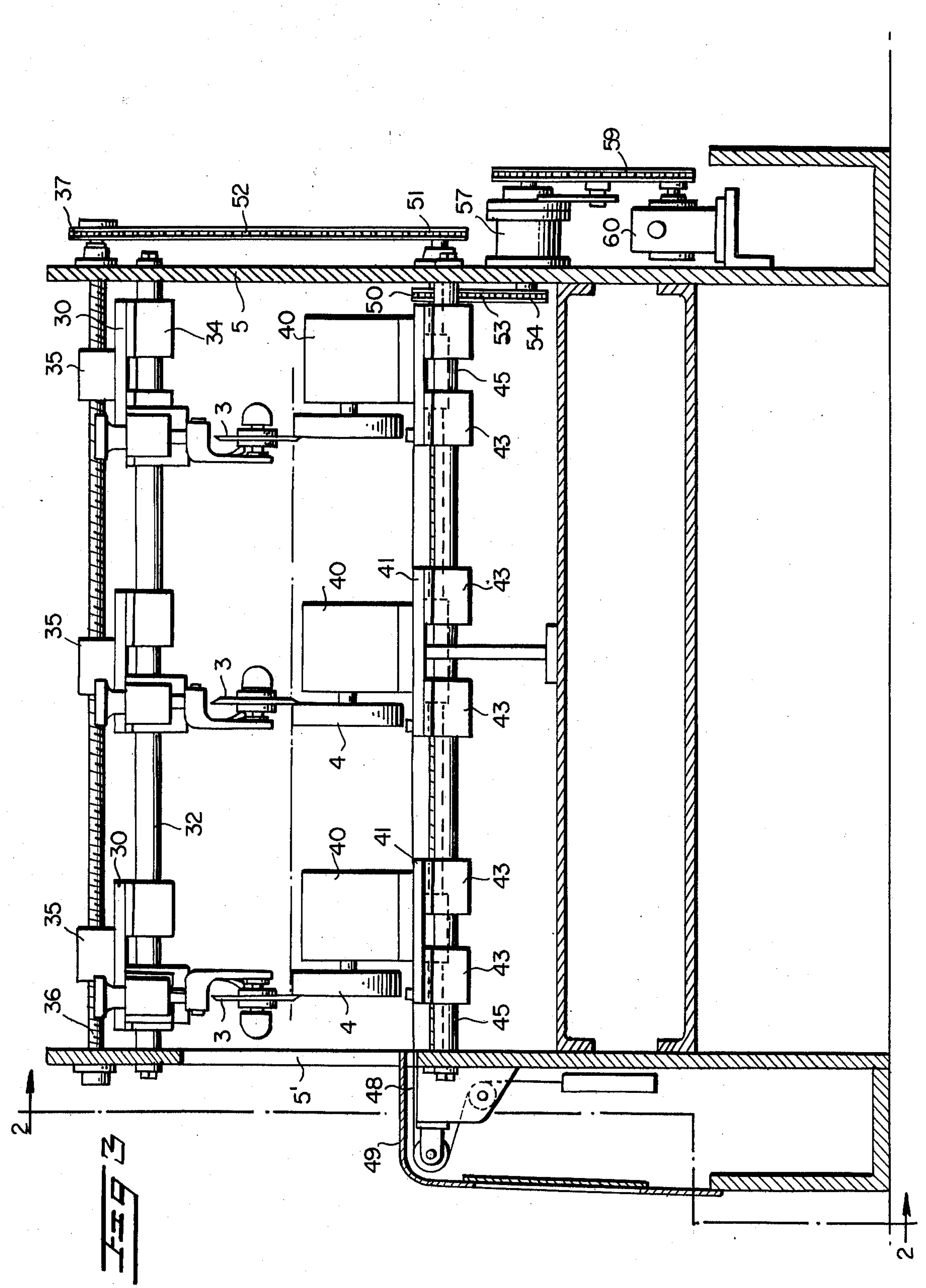
FIG. 3 is a frontal view partially in section and broken away taken generally along the lines 3—3 of FIG. 3.

As can be seen in FIGS. 2 and 3, the slitter blade element 3 of a slitter unit is mounted on a support plate 30. The support plate is in turn suspended on a pair of guide shafts 31,32 which are mounted between the spaced apart end frame members 5,5. The mounting scheme is carried out with the use of ball bushings 33,34 which are fixed to the support plate 30 for engagement with the shafts 31,32. The ball bushings and shafts are preferably of the type manufactured by Thomson Industries, Incorporated, Manhasset, N.Y. 11030. They provide substantially friction-free linear motion for positioning the support plate 30 and slitter blade 3 transversely of the web. For this purpose, each support plate 30 also has mounted thereon a ball nut 35, through which is passed a driven or positioning ball screw 36. The positioning ball screw 36 is drivingly mounted between the two end frame members 5,5 in parallel relationship with the guide shafts 31,32 so that rotation of the ball screw 36 provides friction free, accurate linear motion of its attached support plate and web slitting element. For the embodiment of the invention shown herein in detail, three slitter blade elements 3 are mounted on three separate support plates 30, each of which are suspended on the same pair of guide shafts 31,32. However, in order to provide separate positioning of the three different support plates and slitter unit elements, each support plate 30 has mounted thereon its own ball nut 35 and a separate adjusting ball screw 36 is provided for each ball nut 35. Where additional or fewer slitter units are desired, the number of mounting plates and ball screws/ball nut drives would be adjusted accordingly. Ball screws and ball nuts are disclosed herein as the preferred driving means for positioning the respective slitter unit elements because of their efficient, accurate and substantially friction free operation. Obviously, however, if desired, other mechanical components could be used such as the acme nut and screw.

The slitter unit bands 4 are mounted on the machine frame in a manner similar to that disclosed hereinbefore for the slitter blades 3. As will be seen from a consideration of FIGS. 2 and 3, the motor 40 for a slitter band 4 is fixedly attached to a support plate 41. Further, there are three support plates 41 and slitter band elements 4 provided and arranged in cooperative paired relationship with the slitter blade elements 3. Each support plate 41 has fixedly attached thereto ball bushings 42,43 which accept a pair of guide shafts 44,45. The lower guide shafts 44,45 are mounted between the end frame members 5,5 substantially as set forth for the upper guide shafts 31,32. In each case, Thomson type elements are used to provide a substantially friction free translational movement of the support plates 41 on the shafts. The support plates 41 are positioned transversely on the guide shafts 44,45 with independent ball screws 46 which cooperate with the ball nut elements 47 mounted on each support plate. The ball screws 46 either independently or collectively provide friction free, accurate linear motion of the support plates 41 along the guide shafts 45.

Figure 4:
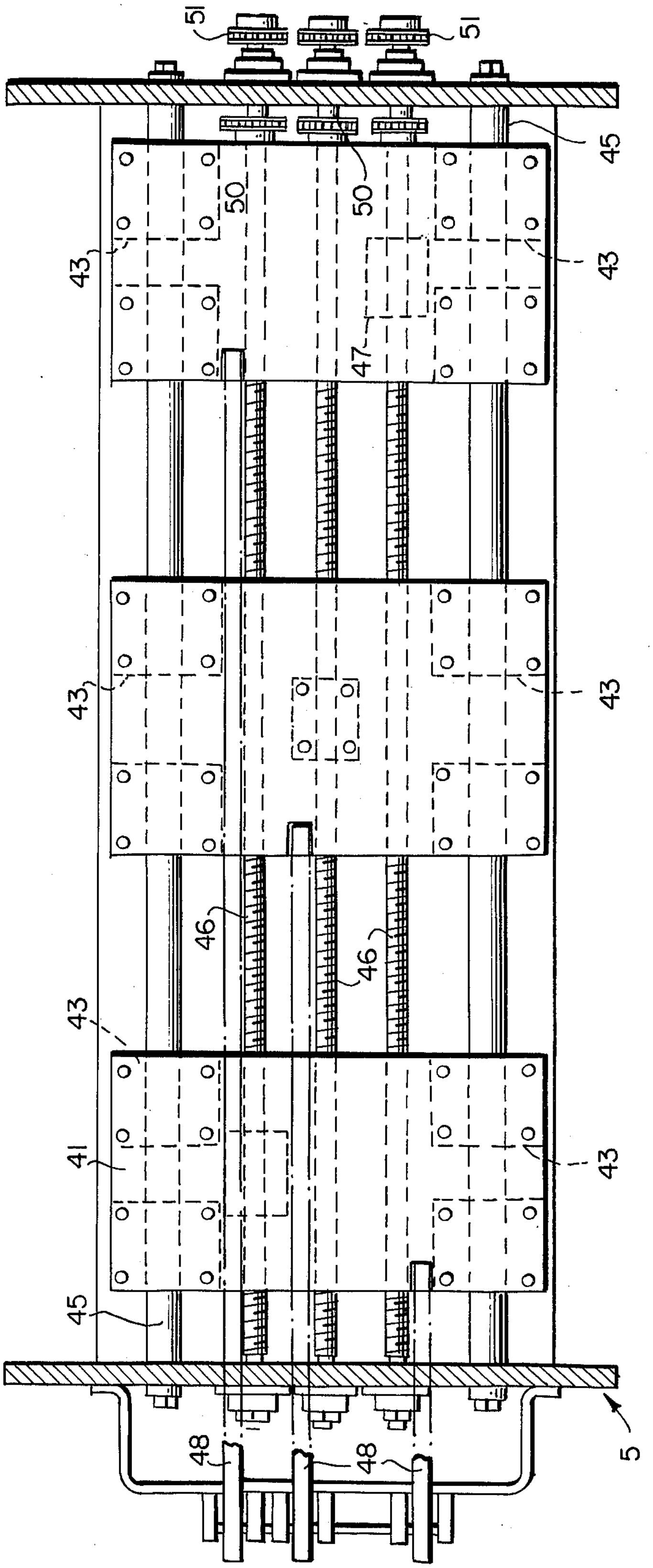
FIG. 4 is a top view taken generally along the lines 4—4 in FIG. 3; and, FIG. 5 is a schematic operational diagram for the components of the present invention.

FIG. 4 shows a top view of the mounting scheme for the slitter band support plates 41. Note that the guide shafts 45 are spaced apart and located near the front and rear edges of the support plates 41. Meanwhile, the ball bushings 43 are paired and aligned to provide a uniform movement along the shafts 45. A separate positioning ball screw 46 and ball nut 47 is provided for each support plate 41. Each support plate further includes a sheet width scale 48 attached thereto which extends to the operator's side of the machine where the scales can be read. The scales indicate to the operator where the respective slitter units are located transversely across the web.

The means for remotely positioning the slitter units of the present invention on the guide shafts can be observed by studying each of FIGS. 2–4. The positioning ball screws 36 for the upper support plates 30 each have a sprocket element 37 attached to one end thereof. Similarly, the positioning ball screws 46 for lower support plates 41 each have a pair of sprockets 50,51 attached near one end thereof. When the slitter units are first installed on the guide shafts 31,32 and 44,45 they are precisely aligned in their respective pairs of slitter blades/slitter bands and when so aligned, the sprocket element 37 for an upper support plate slitter blade element is connected with the sprocket element 51 of the corresponding paired lower support plate slitter band element. For the sake of disclosure in the present invention, a roller chain element 52 is provided in each case. It is clear however, that any mechanical means other than sprockets and roller chains could be substituted as long as the means was provided with safeguards to prevent any slippage or non-synchronous movements that might affect the alignment of the slitter unit elements. Meanwhile, the sprocket elements 50 on the lower support plate adjusting ball screws 46 are connected individually via roller chains 53 to sprocket elements 54 attached to separate clutch/brake assemblies 55,56,57. The clutch brake assemblies 55–57 are of the Electroid type, Model EM-CSB-42-14 volt, with input and output shafts that operate as follows. When a clutch/brake assembly 55,56 or 57 is energized, the input and output shafts are coupled together. When the assembly is de-energized, the input shaft is uncoupled and the output shaft becomes locked in its position.

Figure 5:
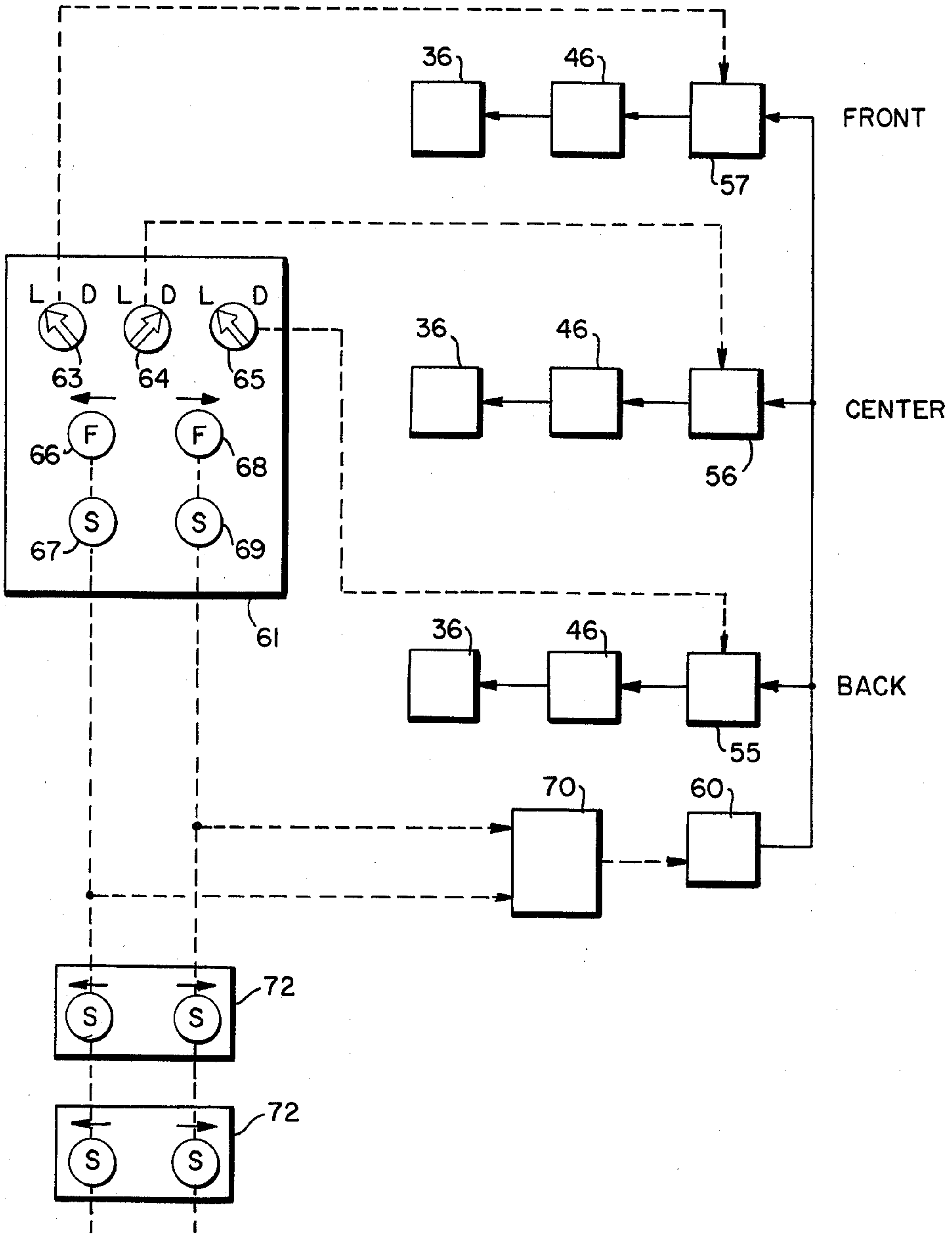

FIG. 5 illustrates a schematic operational diagram showing how the drive components of the slitter system are connected to provide the positioning features of the present invention. Solid lines are used to show the mechanical connections and dotted lines are used for the electrical connections. The single motor 60 is connected by means of the roller chain drive 59 to the three clutch/brake units 55,56,57 as explained hereinbefore. The clutch/brake units in turn drive, or lock, the upper and lower ball screws 36,46 as determined by the actuation of the selector switches 63,64 and 65 on the operator's control panel 61. In addition, push buttons 66,67 68 and 69 are provided on the control panel 61 for determining the direction and speed of motor 60 through the dual speed reversing control device 70. When depressed, push buttons 66,68 operate the motor 60 at a relatively fast speed for rapid coarse positioning of the slitter units in the direction of the arrows as shown. Meanwhile, push buttons 67,69 operate the motor 60 at a much lower speed for precise positioning, once again, in the directions shown by the arrows. Moreover, as explained hereinbefore, one or more remote control stations 72 (see FIGS. 1A and 1B), may be provided for remote positioning of the slitters from points along the machine.

When using three slitter units as illustrated, the operator first turns selector switch 64 to the D or drive position while leaving switches 63 and 65 in the L or locked position. Then, using the directional/speed push buttons 66,68 and 67,69, the operator moves the centrally located slitter unit as required to the center of the machine as determined by the reading on scale 48 attached to the central support plate 41. After the center slitter unit is positioned the edge slitter units are positioned as follows. The operator turns switch 64 to the L or locked position and sets switch 65 in the D or drive position. Then by manipulating the directional/speed push buttons 66,68 and 67,69, the back slitter unit is positioned, as determined by the reading on the scale 48 attached to the back support plate 41, to trim the edge of the back web W. Finally, switch 65 is moved to the L or locked position and switch 63 is turned to the D or drive position for positioning the front slitter unit.

Once all of the slitter units are properly located, each of the switches 63,64 and 65 can be positioned in the D or drive position to connect the slitter units to motor 60 for simultaneous actuation. Then, by pressing one of the directional/speed push buttons 66,68 and 67,69, the operator can simultaneously move all three slitter units to the front or back of the machine as desired, without changing the widths of the webs being cut. Thus it may be seen that the slitter units are mounted to traverse the web from side-to-side either individually or simultaneously in response to a single driving means. Moreover, when the slitter units are mounted on a machine having an automatic edge guide for the unwind stand (not shown), the edge guide can be connected to one of the slitter bases 41. When so connected, the unwind stand would then be adapted to follow the movement of the slitters and thereby maintain uniform edge trim on different webs. Further, with the addition of the remote control stations to such an arrangement, the machine operator can position the slitters and web for optimum location across the width of the machine without altering the web widths. This latter flexibility is one of the very desirable features of the present invention.

Accordingly, while only a preferred embodiment of the present invention has been fully described and illustrated, it should be understood that modifications and variations may be effected thereto without departing from the spirit and scope of the invention as defined in the appended claims.

I claim:

1. Web slitting apparatus comprising guide shafts located above and below a traveling web and fixed between a pair of machine frame elements for suspending a plurality of slitter unit support plates in upper and lower pairs for lateral movement across the width of said web, a slitter unit element fixedly attached to each support plate, a positioning means for each slitter unit support plate mounted between said machine frame elements adjacent to said guide shafts, and means attached to each of said slitter unit support plates for cooperating with said positioning means, the improvement comprising:

(a) a separate connecting means between the positioning means for each pair of slitter unit support plates;

(b) a separate clutch/brake unit for each pair of slitter unit support plates mounted on said machine frame;

(c) individual connecting means between the separate clutch/brake units and paired slitter unit support plates;

(d) a single driving means adapted to drive said slitter units through said clutch/brake units;

(e) a common connecting means between said single driving means and each of said clutch/brake units; and, (f) a control means for selectively disengaging the brake and engaging the clutch of one or more of said clutch/brake units for individually or simultaneously driving one or more of said slitter unit positioning means to position said slitter units laterally of said web.

* * * * *